United States Patent [19]

Wickham et al.

[11] 3,876,831

[45] Apr. 8, 1975

[54] ORIENTATION OUTPUT FROM GRAPHIC DIGITIZER CURSOR

[75] Inventors: Vivian Humphrey Wickham, Ottawa, Ontario; John Edwin Knowles, Stittsville, Ontario; Roy Itaru Hamaguchi, Ottawa, Ontario, all of Canada

[73] Assignee: Instronics Ltd., Stittsville, Ontario, Canada

[22] Filed: Oct. 31, 1973

[21] Appl. No.: 411,242

[30] Foreign Application Priority Data

Sept. 13, 1973 Canada .............................. 180938

[52] U.S. Cl. ......... 178/19; 33/1 PT; 340/146.3 AE; 340/146.3 H

[51] Int. Cl. .... G08b 5/36; G08b 21/00; H04n 3/30

[58] Field of Search ........ 324/34 PS; 340/146.3 AE, 340/146.3 C, 146.3 SY, 146.3 H; 235/92 PS; 33/1 PT, 1 M; 178/18, 19, 20; 318/568

[56] References Cited

UNITED STATES PATENTS

| | | | |
|---|---|---|---|
| 2,782,626 | 2/1957 | Jochum et al. | 33/1 PT |
| 3,529,084 | 9/1970 | Rich | 340/146.3 AE |
| 3,636,256 | 1/1972 | Cameron | 178/18 |
| 3,647,963 | 3/1972 | Bailey | 178/19 |
| 3,721,881 | 3/1973 | Critser | 318/568 |
| 3,732,557 | 5/1973 | Evans et al. | 340/324 R |

*Primary Examiner*—Thomas A. Robinson
*Attorney, Agent, or Firm*—Lewis H. Eslinger; Alvin Sinderbrand

[57] ABSTRACT

It has been known to provide digitizing from an operator-directed free cursor line following index or cursor. Such techniques have provided digital data relative only to the rectangular coordinates of the cursor graticule or datum. More recently, there has arisen the need for output data which is a function of cursor orientation relative to X and Y coordinates. The present invention broadly comprises means for providing signals representative of the angular position of a manually movable index otherwise used as a means of providing signals which are a function of X and Y coordinates of selected points on graphic material such as maps, drawings and photographs. Electromagnetic radiation carrying orientation information links a source or sensor imbedded or located below a planar table top with a sensor or source located in the body of the free cursor. Such radiation may be associated with or independent of the radiation used for the provision of said X and Y coordinate signals. The operator, by actuating of a readout switch, causes the X and Y coordinates of a selected point to be recorded together with the orientation of the index at that point.

36 Claims, 16 Drawing Figures

ORIENTATION OUTPUT FROM GRAPHIC DIGITIZER CURSOR

Figure 1:
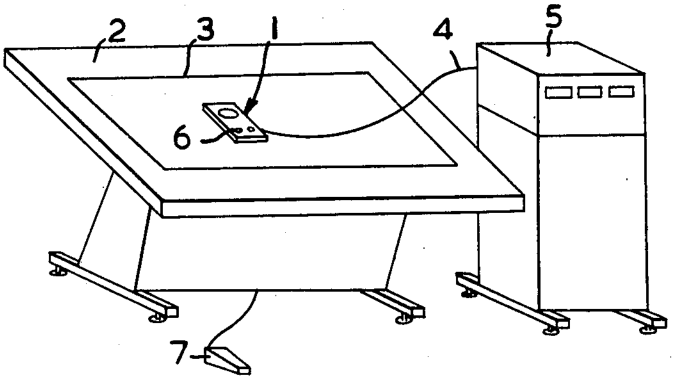

This invention relates to an apparatus for providing orientation information in conjunction with the X and Y coordinate information of selected points on graphic material.

Graphic digitizers are in common use for the conversion of graphic material to a computer acceptable form. Such apparatus permits an operator to record, in digital format, the location of selected points on a planar table to which the graphic material may be attached or projected. By such means a series of selected points, lines, as well as individual locations, can be recorded. The use of such apparatus has become widespread, and particularly as it relates to automated cartography.

In digitizing maps and similar material, it is frequently necessary not only to record the location of a particular graphical representation or line but also its orientation. For example, a house is normally shown parallel to a road regardless of the angular orientation of the road on the map. Also, it is frequently necessary that names be placed at odd angles, particularly along water courses. It is therefore highly desirable for the digitizer operator to not only locate objects such as houses or letters using his crosshair index, hereinafter referred to as a cursor, but also to record the orientation of a suitably identified arm of the crosshair.

Graphic coordinate digitizers used for defining the position of lines or drawings have now reached the point where the speed and accuracy of the human operator is the prime limitation in the process. While fully automatic digitizers have been developed, they are both very expensive and in addition, require monitoring by a human operator. For example, they may be required to be guided through areas of confusion such as where lines intersect or fold back on themselves or the human operator may be required to select each line to be followed. In any case, due to the data recording rates, etc., the speed of fully automatic digitizers are not particularly high. It has been determined that in many instances, the human operator could digitize at similar rates as that provided by very expensive fully automatic digitizers if the accuracy of line following could be relaxed. By combining a free cursor manual digitizer with electronic means of detecting modest amounts of operator error and correcting for same, a relatively low-cost system could be arrived at which would perform at or close to the speed and accuracy of the very expensive fully automatic digitizers. The problem to date in designing a semi-automatic digitizer for detecting and correction of operator error on a free cursor digitizer has been to determine the angle between the point read out by the cursor and the point to be digitized. Heretofore, it has not been possible to record cursor angle with the operator error signal produced by the cursor mounted scanner.

This invention makes possible limited correction of operator error. This is accomplished by scanning the area in the immediate vicinity of the cursor crosshairs and outputting a signal with orientation as to the relative position of the line being followed to the crosshair indicated position. In order that a correction be made, the scanning mechanism must output the difference in terms of distance between the cursor crosshair indicated position of the cursor and the point or line being followed. Again, in order that this distance measurement can be used to adjust the coordinates of the point being digitized, this distance measurement must be combined with angular position of the cursor.

Graphic digitizers are available in a number of forms. The simplest, commonly referred to as the outside arm type, employs a drafting machine type mechanism which the operator moves over the material to be digitized. Such digitizers tend to impede the speed and accuracy of the operator due to the mass and general restraint of the mechanism. Such digitizers can, however, be easily equipped with a means of reading out cursor orientation as the cursor is attached to the table by means of a moveable arm. More recently, a number of free cursor digitizers have appeared using lightweight cursors connected only with a light electrical cable. Such free cursor digitizers are generally preferred by users. However, heretofore, such cursors have not been equipped with the feature of reading digitizers angle. This invention solves this shortcoming with some variation in convenience for all forms of free cursor digitizers.

Having established that the orientation of a magnetic field can be used for cursor rotational determination, various means have been investigated relative to the generation and detection of such fields.

Two basic approaches have been found feasible. One is to employ a rotating field generator and directional sensor and the other is to employ a detector array with which the orientation of a fixed alternating current generated field can be determined.

The term 'rotating field' is used to describe a radiating array consisting of two or more radiators (coils or conductors) mounted with an angular displacement in respect to one another and excited by alternating current with the current in one radiator suitably phase shifted with respect to the current in the other.

The rotating field is most simply generated using two coils mounted at right angles. One is driven directly from an oscillator while the other is driven from the same oscillator with its electrical signal 90° displaced. The field resulting from such a driven coil array will have the instantaneous polarity which is the sum of its two field components as the components rotate around the junction of the coils. The electrical phase of the signal detected when compared to the oscillator source will relate to the physical orientation of the detector. Several embodiments of the rotating field concept will be described hereinafter.

Perhaps the most simple embodiment of the invention is accomplished using the free cursor ditgitizer described in Canadian Pat. No. 912,145 to Eugene Alan Cameron issued Oct. 12, 1972 and which corresponds to U.S. Pat. No. 3,636,256 issued Jan. 18, 1972, both patents being assigned to the present assignee.

In the case of the Cameron patent, a servo-directional signal for X Y coordinate determination is derived by means of radiating a rotating magnetic field from the gantry. This rotating field can be utilised for purposes of determining angular readout in accordance with this invention. It is desirable that the rotating field be optimised when used for the purpose of the present invention.

A second embodiment of the rotating field concept is applicable to digitizing tables which determine the coordinate location of the cursor by all electronic means as, for example, (a) systems using the continuous phase shifter approach, for example, as shown in U.S. Pat. No. 3,647,963 issued May 7, 1972, by Knight V. Bailey and U.S. Pat. No. 3,732,557 issued May 8, 1973, by David C. Evans, or (b) the magneto-striction pulse time arrival approach. In these cases, a coil array, used to generate a rotating field, is affixed to the cursor rather than the table and a single flattened coil forms part of the table top structure. This can perhaps be most easily accomplished through the use of a double-sided printed circuit board with parallel conductors on either side of the board inter-connected at the ends to form a continuous coil in a flat laminar form. The resultant rotating field from the cursor will induce a signal into the single flattened table coil. By comparing the phase of the signal induced to that of the oscillator driving the cursor, an electrical indication of cursor orientation can be acquired. It will, of course, be obvious that the aforementioned system can be reversed with two flattened coils angled and disposed beneath or imbedded in the planar table surface which coils radiate a broad rotating electromagnetic field. In this case, a directional detector is mounted in the cursor.

The use of a non-rotating fixed directional field with a location determining detector array will also be described. One such embodiment would relate to the digitizer patented by A. R. Boyle under Canadian Pat. No. 816,325 issued June 24, 1969. Boyle's device makes use of a vertical field for coordinate location which cannot be used for cursor orientation purposes. The concept which Boyle describes has been offered commercially with an angle determining cursor. The angle cursor offered makes use of two coordinate locating coils in a cursor body. To achieve orientation information, the coordinate location of the first coil is displayed and recorded followed by the coordinate location of the second coil. Through the use of a computer the angle might conceivably be thereby calculated. Obviously this is not nearly as satisfactory as having a direct angular readout of cursor orientation. In Boyle's system, a servo mechanism locates a gantry trolley immediately below the cursor. By radiating a directional field either time shared with the coordinate field or sufficiently removed in frequency as not to interfere, the angular location of such a field can be determined by a field detector array mounted on the gantry. In fact, it may be possible to time share the detector array used for coordinate determination if this is found to be more convenient.

The present invention can be applied to a digitizer patented by J. Critser under U.S. Pat. No. 3,721,881 issued Mar. 20, 1973 and assigned to the same assignee as the present application. Critser radiates a rotating field in a similar manner as does Cameron. The angular detection circuitry applicable to the Cameron approach will in essence operate with the Critser approach.

It should be recognized in implementing this invention that accuracy will relate to the numbers, location and characteristics of the radiators and detectors. While we have described the concept employing a radiating array as generating a rotating vector, for highest angular accuracy it is best to maintain the instantaneous amplitude of the rotating field constant at the points of detection. If accuracy is found difficult to achieve the detector array configuration can be altered to improve accuracy. It will be shown that the amplitude of detection is converted to vectors which when resolved, provide an angular indication.

In the case of the Critser approach, highest accuracy with a single coil would tend to be acquired with the field orientation detector mounted directly above the intersect points of the two radiators. Unfortunately, this location is reserved for the coordinate indicating crosshairs and hence, is generally not available for mounting of an angular determination detector. For this reason, if extreme accuracy is desired, it may be found necessary to locate an array of unidirectional detectors within the cursor.

It is a feature of one object of the invention to provide orientation data in addition to X and Y coordinate data in graphic digitizers.

In accordance with the foregoing features of the invention, there is provided means adapted to provide angular orientation signals at selected points relative to a preselected axis of reference comprising: a planar table, a manually moveable cursor disposed above the table, an alternating magnetic field disposed in a plane disposed adjacent and parallel to the planar table, means for detecting a vector component of said alternating magnetic field in a selected direction, electronic means for converting the vector component into digital information in terms of angular degrees, and operator actuated readout means provided such that when actuated an output indicative of the vector angle is ascertained at the point of interest.

It is a feature of another object of the invention to provide the angle of orientation of a free cursor used in a graphic digitizer which graphic digitizer already provides information relating to the X and Y coordinates position of the cursor. In accordance with the last mentioned feature, the method broadly comprises first and second alternating magnetic fields having fields of influence which are intercepted by an orientation detection coil means, the said coil having induced therein a signal which is a function of the vector sum of the two magnetic fields and comparing the phase of the vector sum with a standard phase reference and utilizing said comparison to produce an output signal indicative of the angle of orientation of the cursor.

Figure 2:
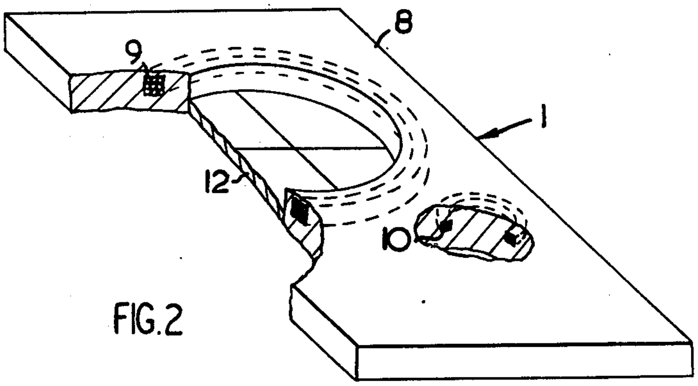
Figures 3A, 3B, 4:
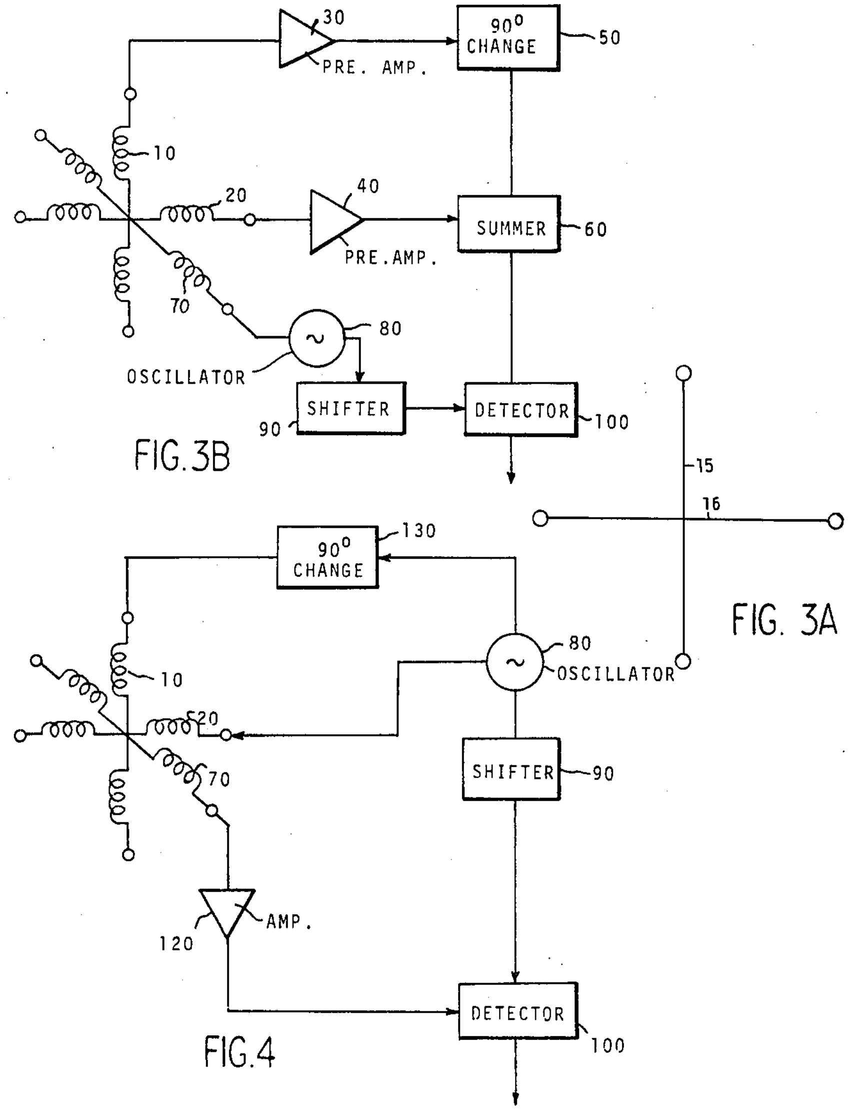
Figure 5:
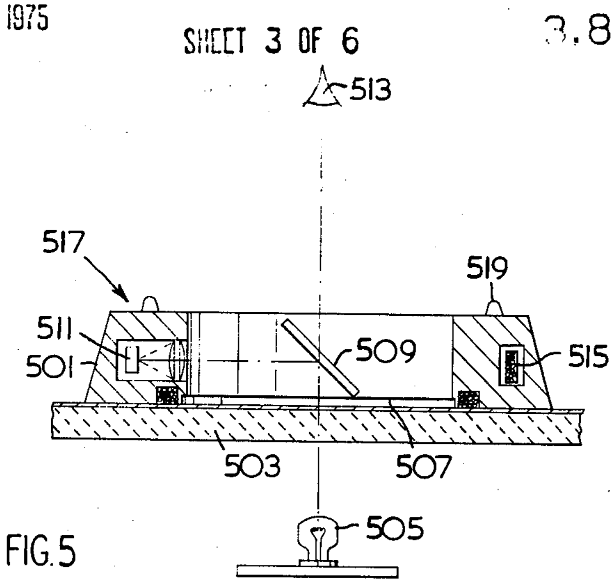
Figure 6:
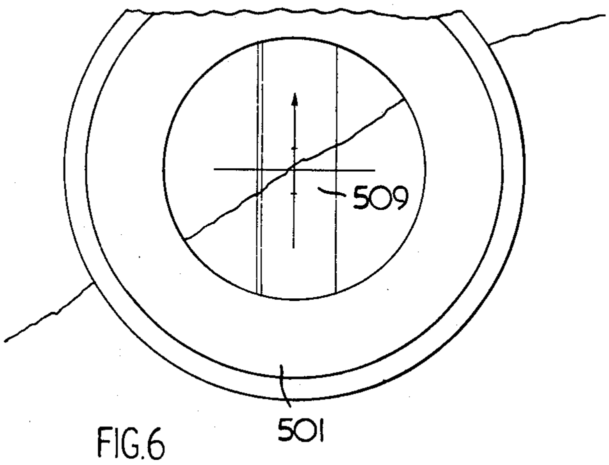
Figure 7A:
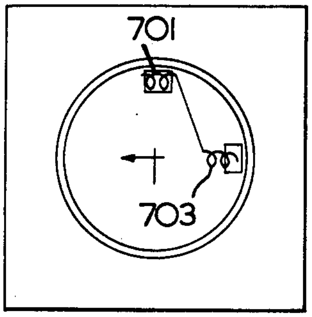
Figure 7D:
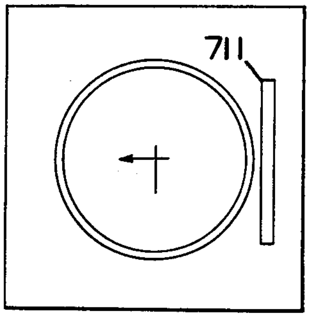
Figure 7B:
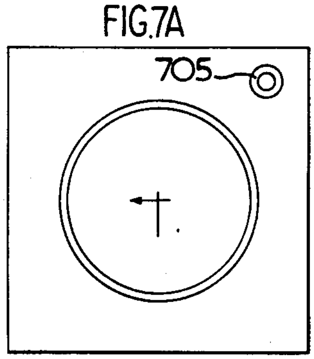
Figure 7E:
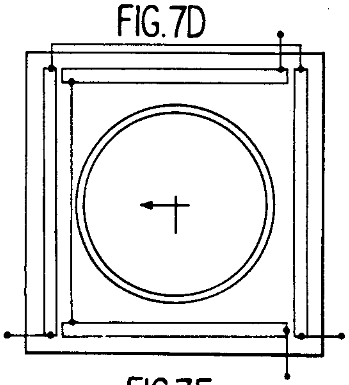
Figure 7C:
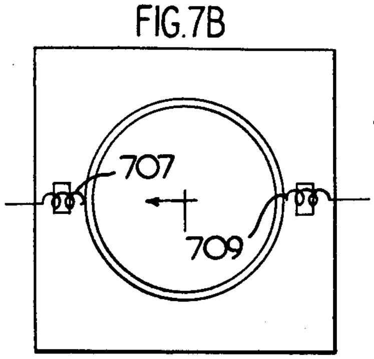
Figures 8A, 8B:
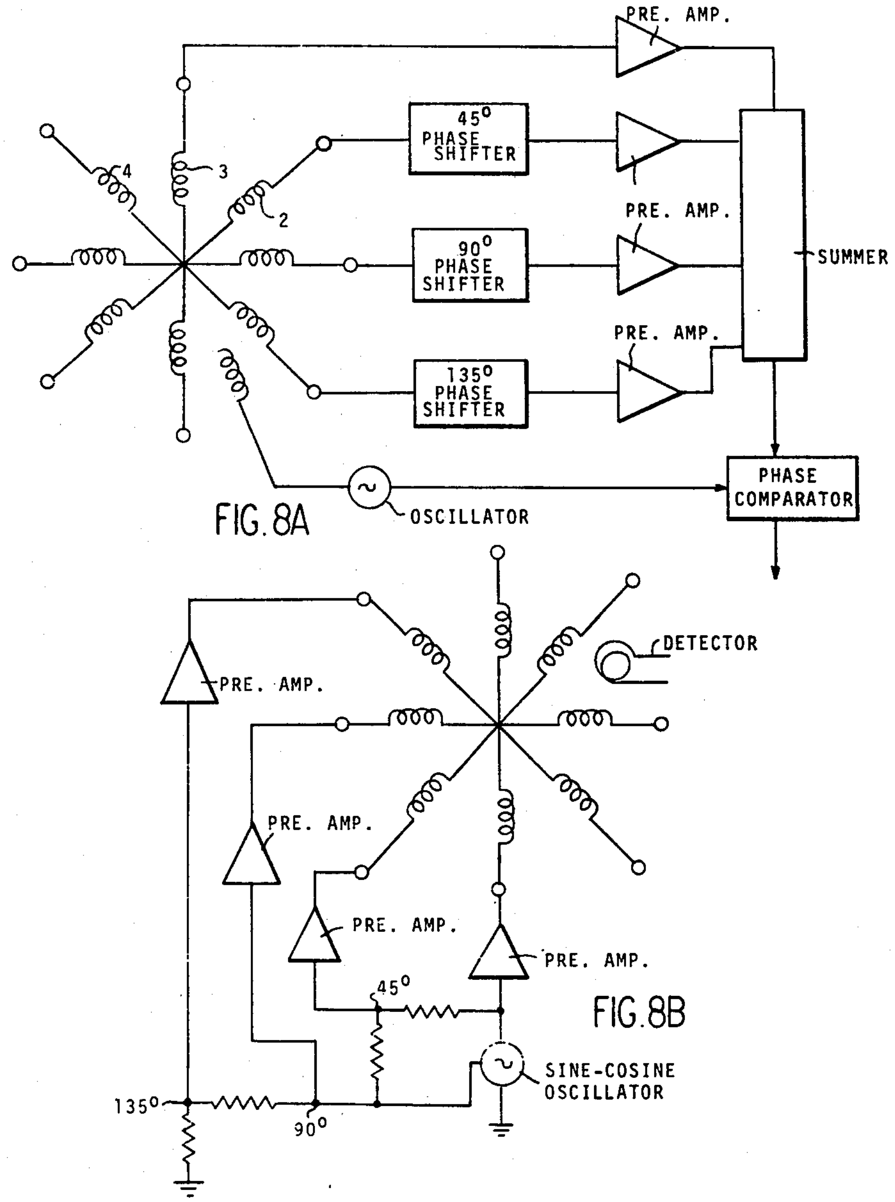
Figure 9:
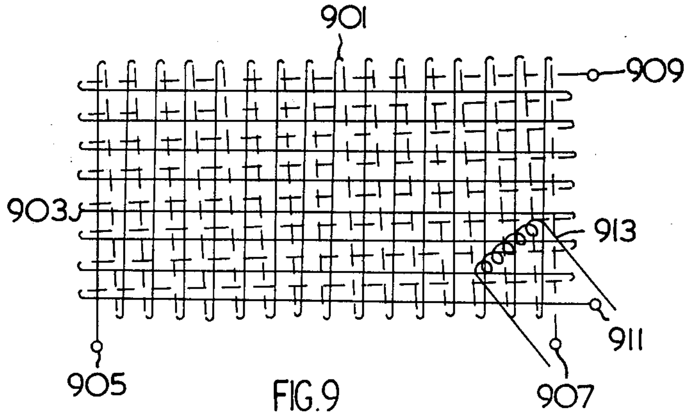
Figure 10:
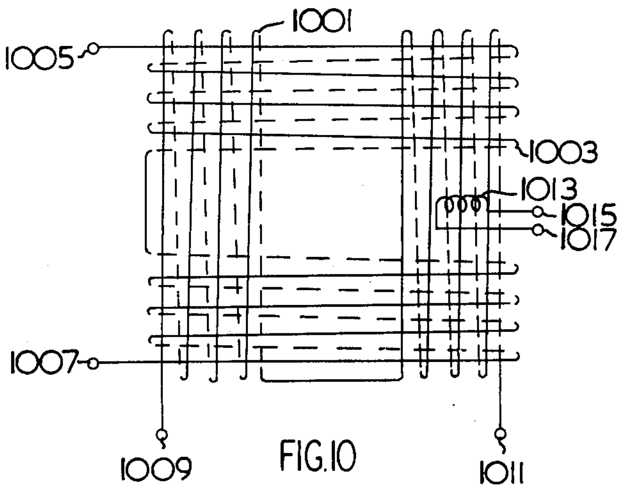

Preferred embodiments of the invention will now be described with reference to the accompanying drawings in which:

FIG. 1 is a pictorial view of a line tracing device and associated digitizer,

FIG. 2 is an enlarged pictorial view of a cursor, showing a location and orientation of an angle sensing coil, FIG. 3A represents a pair of servo-located radiating wires, FIG. 3B represents the basic schematic of a cursor orientation-detection system, FIG. 4 represents the basic schematic of a circuit providing means for measuring angular position between a radiating array and a directional detector, FIG. 5 is a cross section of a cursor having an operator error detection array, FIG. 6 is a diagram showing the appearance of a line to be digitized as seen by the operator using the error detector cursor as shown in FIG. 5, FIGS. 7A to 7D show positions for the location of coils on the cursor, FIG. 7E shows a cursor coil array used for detecting the orientation of an angularly disposed field associated with the planar table, or for use in generating a rotating magnetic vector from the cursor to be detected by the unidirectional table mounted detector, FIG. 8A is an elaboration of FIG. 3B wherein additional detector elements are deployed together with associated preamplifiers and phase shifters to possibly improve accuracy, FIG. 8B is an elaboration of FIG. 4 wherein additional radiating array elements are deployed together with suitable phase shifters and drive elements to possibly improve accuracy, FIG. 9 is a diagram showing an array having two coils having its two coils at rightangles and also showing an interacting coil adjacent thereto, and FIG. 10 is similar to FIG. 9 but wherein the double wound coil has a central area which is free from wires.

Referring to FIG. 1, the apparatus comprises a cursor 1, a planar table top 2, the graphic material to be digitized 3, a light flexible electrical lead 4 to the cursor 1, associated electronic apparatus 5, a cursor mounted switch 6 to initiate readout and an alternate footswitch to initiate readout 7. The operator may select and record the X Y location of the cursor relative to the planar table and hence, to the fixed drawing and in addition, at the same time if he so desires, obtain data relating to the orientation of the cursor. If desired, the cursor orientation can be recorded or displayed, for example, by a 0 to 360 three digit 'Nixie' display.

FIG. 2 illustrates the construction of the cursor 1 and which consists of a rigid housing 8 in which is located a coordinate sensing coil 9 and an angle sensing coil 10. The coordinate sensing coil provides the necessary signal to servo locate a set of radiating coils 10 and 20 in one embodiment, shown in FIG. 3B, or radiating wires 15 and 16, in another embodiment, shown in FIG. 3A, as the case may be, so that the coils or wires may be servoed so as to follow and locate directly beneath the sensing coil. This function is not part of this invention and its description is adequately described in the aforementioned digitizer patents and patent applications. The housing 8 is of a material which will provide little hindrance to the passage of electromagnetic waves having a frequency, for example, of between 0.01 and 100 KHz and which provides rigidity to hold a reticule 12 without distorting the physical and electrical configuration of the sensing coils.

The choice of operating frequency is seen to be fairly wide, and the frequency chosen will be a compromise between the acceptance of a degree of background noise in the signal produced if the frequency is too low and the interaction with metallic objects, i.e., rings and watches, if the frequency is too high.

Referring to FIG. 3A there is shown a pair of radiating wires 15 and 16 which are supplied with alternating voltages which are in quadrature to one another. The pair of wires are moveable as a whole by servo-locating means of the type shown in Critser's U.S. Pat. No. 3,721,881 dated Mar. 20, 1973.

FIG. 3B represents the basic schematic of a cursor orientation detection system employing directional electromagnetic radiation from a coil and detecting the orientation of this source of radiation by means of a detector array. It does not matter whether the source of radiation or the detector array are cursor mounted as the system will detect the angular differential between the source and the detector array.

In the example circuit of FIG. 3B, elements 10 and 20 could take a variety of forms. They may be two large printed circuit boards overlapping the entire working area of the digitizer. In this case, coil windings may be formed by parallel conductors etched on either side of a printed circuit board and interconnected at the edges to form a wide flat continuous coil. Two such boards mounted at right angles and electrically insulated could, in fact, form part of the planar table surface used for digitizing. Circuit elements 10 and 20 may be much smaller taking the form of small gantry mounted coils. They may also be solid state electromagnetic detectors such as Hall Effect devices. The detector array described may be more involved using more detector elements and more complex circuitry. For most applications, however, the form shown will likely be found the cheapest and simplest.

Circuit elements 30 and 40 represent low noise stable preamplifiers which may employ band limiting filtering to reduce noise pickup. Circuit element 50 is a 90 electrical degree phase shifter permitting the output of the detector array which is amplitude modulated to be processed in terms of phase angle rather than amplitude.

Circuit element 60 is an electrical summer which accepts the two signals processed from the detector array and provides an output whose phase angle is a function of the orientation of the field detected by the array. Circuit element 70 represents a source of radiation which may be cursor mounted if elements 10 and 20 are associated with a planar table or table mounted if elements 10 and 20 are associated with the cursor. Circuit element 80 is a source of alternating current. For example, 3 KHz. Circuit element 90 is a continuously variable phase shifter which is used for electrically rotating the apparent position of orientation. It may be used both to correct some overall or accumulated errors in the system and to provide an operator control for adjusting the position of his zero orientation reference as recorded and displayed. It may be found desirable, particularly if digitally stored error correction is employed to dispense with this circuit element and replace same with signal processing at the digital level. Circuit element 100 is a phase detector which detects the electrical phase relationship between the signal from the array summer and the oscillator signal as processed by the phase shifter 90. The output of the phase detector may be or could be converted to a 0° to 360°digital display and signal for recording. It may be found desirable to effectively adjust the recorded orientation by digital means rather than analog means through the use of circuit element 90.

FIG. 4 represents a means of measuring the angular position between a radiating array and a directional detector. The detector can be table or cursor mounted as best suits the overall design.

Circuit elements 10 and 20 are as in FIG. 3B, i.e., coils. Circuit element 70 may be a coil or a number of interconnected coils having positions or orientations best suited to achieve a suitable accuracy. Circuit element 70 may also employ a single solid state detector or a plurality of detectors such as Hall Effect devices. Circuit element 120 is a low-noise signal preamplifier which may have bandwidth limiting to reduce undesired noise pickup. Circuit element 130 shifts the phase of the magnetic radiation from array element 10 by 90° to match its physical orientation in respect to radiating element 20. Circuit element 130 may, of course, be incorporated in the oscillator element 80, for example, in the form of a sine/cosine generator. Other circuit elements are described as per FIG. 3B.

Referring now to FIG. 5, there is shown a cross section of a cursor for correction of operator error while automatic digitizing. The frame 501 of the cursor is shown resting on a transparent planar table 503 beneath which there is a light source 505 mounted on a gantry trolley of the type previously discussed in connection with the Cameron patent. The cursor 501 carries a graticule disc 507 having mutually perpendicular graticules thereon or a suitable graticule within the optical system or a prism and a partly reflecting mirror 509 reflects a portion of the graticule and an image to be scanned onto a scanning array 511 and the remaining portion of the same images pass to the eye indicated at 513. An angle detection coil is shown embedded in the cursor body at 515. An operator switch 517 is depressed when the operator wishes to digitize through areas of confusion and a lamp located at 519 is turned on to indicate to the operator that no line or more than one line is being scanned. When the lamp 519 is "on" the output for the recording is interrupted.

When the switch 517 is not depressed, the image of the line being scanned, together with the superimposed image of the graticule, is reflected by the mirror 509 to the scanning array 511, comprising a conventional photo-diode array. It is appreciated that, if the scanned line is not in precise alignment with the axis of symmetry of the graticules, i.e., the crosshairs, then, during automatic digitizing of the cursor position, a corresponding error will be manifested. That is, the displacement between the scanned line and the crosshairs will be included in the digitizing. By superimposing the graticule array and the scanned line on the diode array, this operator error is sensed and automatically corrected. That is, the diode array is seen to detect the displacement of the scanned line from the crosshair position, and such displacement is readily compensated. However, if the line being scanned admits of a discontinuity, or if two or more lines are simultaneously imaged onto the scanning array, the resultant confusion to the digitizing system is avoided by depressing the operator switch 517 to thereby provide a non-automatic digitizing operation.

FIG. 6 is a schematic diagram showing the appearance of a line being digitized to the operator.

FIGS. 7A to 7E show various positions for angle sensing coils located on the cursor. For example, in FIG. 7A a pair of coils 701 and 703 may be mounted and spaced 90° apart around the cursor but having their respective coil axes parallel to one another. FIG. 7B shows a cursor having a single flat coil 705 used for angle determination. FIG. 7C shows a pair of angle sensing coils 707 and 709 spaced each side of the cursor opening having a common axis and electrically connected in series. FIG. 7D shows a single coil 711 mounted to one side of the cursor opening. FIG. 7E shows a cursor coil array mounted on either side of the cursor.

The alternative circuits shown in schematic diagrams, FIGS. 8A and 8B will now be described.

In FIG. 8A the oscillator energises a single coil and the output from the oscillator is also fed to a phase comparator. Sensing of the components of the resultant field produced is accomplished by four pairs of sensing coils which coils are angularly disposed by 45 electrical degrees between each. One coil, coil No. 3 in FIG. 8A, is merely preamplified before being fed to a summer circuit. The output from the other three coils of the group have phase shifted by 45, 90 and 135 electrical degrees before being preamplified and passed to the summer circuit. Such a circuit provides excellent resolution.

FIG. 8B is substantially the reverse of FIG. 8A in as much as there are a plurality of field coils displaced 45 electrical degrees between them and fed by a common sine/cosine oscillator and with a suitable resistive network to provide the necessary phase relationships. In this case a single detector coil may be used to ascertain the component field due to the coils.

Referring now to FIG. 9, there is shown an arrangement whereby a pair of coils 901 and 903 are arranged perpendicular to one another and having terminals 905-907 and 909-911, respectively. These coils may be wound or printed on a planar board disposed below and parallel to the working surface of a table. As with the previous embodiment, the coils may be supplied with alternating currents wherein the voltage in one coil is in quadrature to the current in the other coil. The associated cursor carries a sensor coil 913 and the voltage induced in the coil 913 will be a function of the vector sum of the two magnetic fields developed by coils 901 and 903. The associated circuitry can be similar to that shown in FIG. 4. Using the configuration as indicated in FIG. 3B coil 913 can be the field radiator 70 and coils 901 and 903 as field detectors 10 and 20. One axis of the FIG. 9 coil array may be used independently located beneath the planar table surface as the detection means circuit element 70 in FIG. 4 where circuit elements 10 and 20 of FIG. 4 are mounted in the cursor.

FIG. 10 shows another embodiment which is similar to that shown in FIG. 9 excepting that the coils are curtailed in the central region to provide a region which is free of windings. This free area may be used for locating a coordinate sensing coil in a cursor or to provide for the passage of light from a gantry mounted lamp. In this case the coils comprises 1001-1003 having associated terminals 1005-1007 and 1009-1011. The sensing coil 1013 has terminals 1015-1017.

The embodiments of the invention in which an exclusive property or privilege is claimed are defined as follows:

1. A method of obtaining angular orientation output from a free cursor graphical digitizer of the type having a working surface for supporting graphical information wherein said cursor includes a coordinate sensing coil for deriving X Y coordinate output signals, a magnetic field radiator disposed in a first plane parallel to said working surface and a magnetic field detector disposed in a second plane parallel to said working surface, said method comprising the step of:

a. energizing said magnetic field radiator to establish an alternating magnetic field in said first plane, and
b. detecting a vector component of the alternating magnetic field in a direction aligned with said cursor angular orientation to induce an output signal in said magnetic field detector which is directly related to said angular orientation.

2. A method according to claim 1 wherein, the magnetic field radiator is beneath said working surface such that the step of establishing an alternating magnetic field is carried out in a plane disposed beneath said working surface and wherein the magnetic field detector is provided in said cursor such that the step of detecting the vector component of the alternating magnetic field is carried out in a plane above said working surface.

3. A method according to claim 1 wherein the magnetic field radiator is provided in said cursor such that the step of detecting the vector component of the alternating magnetic field is carried out in a plane above said working surface.

4. A method according to claim 1 wherein the alternating magnetic field is produced by a separate plurality of magnetic fields having selected phase spacing.

5. A method according to claim 2 wherein said alternating magnetic field is established below said working surface and wherein said field comprises a first alternating magnetic field component, a second alternating magnetic field component which lags the first alternating magnetic field by 45 electrical degrees, a third alternating magnetic field which lags the first alternating magnetic field by 90 electrical degrees and a fourth alternating magnetic field which lags said first alternating magnetic field by 135 electrical degrees.

6. A method according to claim 2 wherein said alternating magnetic field comprises a first alternating magnetic field and a second alternating magnetic field which lags said first alternating magnetic field by 90 electrical degrees.

7. Apparatus for providng the slope of a line or the orientation of pictorial or other graphic data at selected points on a drawing, map or photograph mounted on a table relative to a preselected axis of reference comprising:

a source of electromagnetic radiation disposed beneath said table including a first X axis source and a second Y axis source driven, respectively, by alternating current signals 90° displaced, thereby providing a magnetic field having a rotating phase vector, a moveable cursor disposed above the table, an electromagnetic radiation orientation detector affixed to the moveable cursor and effective to receive electromagnetic radiation through the table from the said electromagnetic sources and to produce a signal with a phase shift directly proportional to the amount of rotation of the cursor relative to said preselected axis of reference, and, readout means providing an output indicative of the angle by which the cursor is rotated.

8. Apparatus as in claim 7 wherein the electromagnetic radiation used has a frequency lying in the range of 0.01 to 100 KHz.

9. Apparatus as in claim 7 wherein the electromagnetic radiation used has a frequency close to 3 KHz.

10. Apparatus as in claim 7 in which the cursor is manually moveable and includes a window provided with an index in the form of crosshairs.

11. Apparatus as in claim 7 further including an actuator for initiating said readout means.

12. Apparatus as in claim 10 wherein said window is surrounded by a first coil having an output which when processed provides the X and Y coordinates of the index relative to said drawing, map or photograph.

13. Apparatus as in claim 7 wherein said electromagnetic orientation detector comprises a second electromagnetic coil.

14. Apparatus as in claim 7 wherein said electromagnetic orientation detector comprises a solid state device.

15. Apparatus as in claim 14 wherein said solid state device is a Hall Effect generator.

16. Apparatus as in claim 7 wherein the signal detected by said electromagnetic radiation orientation detector is selectively pre-amplified to substantially eliminate unwanted signals and thence passed to a phase detecting circuit, said phase detecting circuit producing an output signal which varies as a function of the said amount of rotation of the cursor.

17. Apparatus as in claim 16 further including a phase shifter connected between said pre-amplifier and said phase detecting circuit.

18. Apparatus as in claim 16 further including means for phase shifting the reference phase signal.

19. Apparatus as in claim 16 wherein said output signal is passed to a selected one of a record device or a display device or both.

20. Apparatus as in claim 19 further including a digital reference selector between said phase detecting circuit and the selected one of said recording device and display device.

21. Apparatus as in claim 14 wherein the said output signal from said phase detecting circuit consists of a three digit digital number.

22. Apparatus as in claim 7 in which the electromagnetic radiation source comprises two sets of coils disposed with their axes respectively at right angles to one another, said coils being driven by an alternating current source with one set of coils being driven 90° phase displaced to the other.

23. Apparatus as in claim 7 in which the electromagnetic radiation source comprises two sets of wires disposed with their axes at right angles to one another, said wires carrying alternating current with the phase of same being 90° shifted in the case of one of the wires.

24. Apparatus for providing the slope of a line or the orientation of pictorial or other graphic data at selected points on a drawing, map or photograph relative to a preselected axis of reference comprising a source of electromagnetic radiation located below a planar table but in close proximity to that table including a first X axis source and a second Y axis source, means for supplying an alternating current signal to said X axis source, means for supplying the said signal shifted by 90 electrical degrees to the second Y axis source, a manually moveable cursor disposed above the table, an orientation detector affixed to the moveable cursor and effective to receive radiations through the table from the radiation sources and to produce a signal with a phase shift directly proportional to the amount of radiation of the cursor relative to a preselected axis of reference.

25. A method for measuring the angle of orientation of a free cursor with reference to a datum, on a graphic digitizer having a working surface thereon, said method comprising the steps:

i. establishing first and second alternating magnetic fields beneath said working surface, said fields having axes which lie in a plane which is substantially parallel to said surface, and which axes are mutually perpendicular, ii. detecting the magnetic flux from each of said first and second magnetic fields at a point on said cursor adjacent the graticule thereof to produce an output signal, said output signal having an electrical phase which is relative to a reference signal and which is a function of the angle of orientation of the cursor with reference to a said datum, and iii. comparing the electrical phase of said output signal with a reference phase signal to produce a read-out signal which is a function of the angle of orientation of said cursor.

26. The method as in claim 25 further including the step of converting said read-out signal into digital form.

27. The method as in claim 25 including the step of adjusting the electrical phase angle of said reference phase signal.

28. Apparatus for providing the slope of a line or the orientation pictorial or other graphic data at selected points on a drawing, map or photograph mounted on a table relative to a preselected axis of reference comprising:

a source of electromagnetic radiation, including a first X-axis source and a second Y-axis source disposed in a cursor which is moveable above the said table, said X-axis source and said Y-axis source being driven by alternating current signals which are displaced by 90 electrical degrees thereby providing a magnetic field having a rotating phase vector, electromagnetic radiation orientation detection means mounted below said table and effective to receive electromagnetic radiation through the table from the said electromagnetic sources and to produce a signal with a phase shift directly proportional to the amount of radiation of the cursor relative to a preselected axis of reference, and p1 read-out means providing an output indicative of the angle by which the cursor is rotated.

29. Apparatus as in claim 28 wherein the electromagnetic radiation used has a frequency lying in the range of 0.1 to 30 KHz.

30. Apparatus as in claim 28 wherein the electromagnetic radiation used has a frequency close to 3 KHz.

31. Apparatus as in claim 28 in which the manually moveable cursor includes a window provided with an index in the form of crosshairs or the equivalent.

32. Apparatus as in claim 28 further including an actuator for initiating said readout means.

33. Apparatus as in claim 7 wherein said cursor includes a graticule and further includes means for detecting the position of a line or mark being located relative to a reference point on said graticule.

34. Apparatus as in claim 33 wherein the said means for detecting the position of a line or mark further includes a scanning array, said array producing a signal which is a function of the linear distance from the said reference point on said graticule and a point on the said graphic data.

35. A method according to claim 3 wherein said alternating magnetic field is established above said working surface and wherein said field comprises a plurality *n* of alternating magnetic field components separated by 360/2n electrical degrees in time.

36. A method according to claim 2 wherein said alternating magnetic field is established below said working surface and wherein said field comprises a plurality *n* of alternating magnetic field components separated by 360/2n electrical degrees in time.

* * * * *